United States Patent
Aoki et al.

(10) Patent No.: US 6,559,616 B2
(45) Date of Patent: May 6, 2003

(54) ROTATIONAL PULSE GENERATING CIRCUIT FOR MOTORS

(75) Inventors: Koji Aoki, Nagoya (JP); Nobuyasu Kimura, Nishikamo-gun (JP); Hideyuki Kanie, Anjo (JP); Hitoshi Ishikawa, Hekinan (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 271 days.

(21) Appl. No.: 09/794,624

(22) Filed: Feb. 28, 2001

(65) Prior Publication Data

US 2001/0026180 A1 Oct. 4, 2001

(30) Foreign Application Priority Data

Feb. 29, 2000 (JP) ......................................... 2000-053514

(51) Int. Cl.[7] .............................................. G05B 19/10
(52) U.S. Cl. .................. 318/567; 318/568.1; 318/600; 318/603; 318/798; 318/799; 318/807; 388/811; 388/814; 388/911; 388/912; 327/291; 327/298
(58) Field of Search ............................. 318/567, 568.1, 318/600, 603, 632, 798, 799, 807, 810, 470; 388/811, 814, 911, 912; 327/291, 298

(56) References Cited

U.S. PATENT DOCUMENTS

| | | | | |
|---|---|---|---|---|
| 4,924,166 A | * | 5/1990 | Roussel ...................... | 318/608 |
| 5,497,326 A | | 3/1996 | Berland et al. | |
| 5,550,880 A | * | 8/1996 | Abdel-Malek et al. ...... | 375/376 |
| 5,646,497 A | * | 7/1997 | Stickel ........................ | 318/799 |
| 6,172,473 B1 | * | 1/2001 | Oka et al. .................... | 318/244 |
| 6,320,341 B1 | * | 11/2001 | Oka et al. .................... | 318/466 |
| 6,326,757 B1 | * | 12/2001 | Aoki et al. .................. | 318/599 |

OTHER PUBLICATIONS

New Car Manual:Soarer, May 1991, Toyota Motor Co., Ltd., pp. 58 and 59.

* cited by examiner

Primary Examiner—Bentsu Ro
Assistant Examiner—Rina I. Duda
(74) Attorney, Agent, or Firm—Oblon, Spivak, McClelland, Maier & Neustadt, P.C.

(57) ABSTRACT

A motor rotational pulse generating circuit for a motor is provided which generates a correct pulse signal even at an initial turning-on stage of the motor, by adjusting a filter cutoff frequency in response to motor rotational condition. The motor rotational pulse generating circuit includes a rotational pulse generation circuit 20 which generates ripple pulses based on a signal being inputted from the DC motor 1, in which a ripple is superposed whose frequency is in proportion to a rotation number of the DC motor 1. A filter 3 makes a cutoff frequency variable on the basis of a clock signal issued from a PLL circuit 6. An oscillation frequency at an oscillator VCO10 is determined by the ripple pulses and a motor rotation condition signal inputted by way of circuits 12 to 16 inclusive. A microcomputer 20 operates, when the motor is turned on, to cause the oscillator VCO10 to issue a preliminary clock signal. The microcomputer 20 measures the oscillation frequency on the basis of the resultant preliminary clock signal to judge whether or not an initial cutoff frequency of the filter 3 is correct. If the result is negative, a switching circuit 17 is controlled in switching mode to adjust an attenuance of an attenuator 16, thereby correcting the initial cutoff frequency.

13 Claims, 5 Drawing Sheets

(a)

switched capacitance circuit (b)

cutoff frequency $$fC = \frac{1}{2\pi RC} \qquad fC = \frac{1}{2\pi \cdot \frac{1}{fC1} \cdot C} = \frac{fC1}{2\pi C}$$

motor initiation   ripple pulse train generation

ROTATIONAL PULSE GENERATING CIRCUIT FOR MOTORS

CROSS REFERENCE TO RELATED APPLICATIONS

The present application is based on Japanese patent application 2000-053514, filed on Feb. 29, 2000, which is incorporated by reference in its entirety.

BACKGROUND OF THE INVENTION

1. Field of the Invention

The present invention is directed to a rotational pulse generating circuit for a motor, which generates a pulse signal in the form of ripple pulse train, and whose frequency is in response to a rotation number of the motor, by receiving, for example, a signal which is superposed with a ripple whose frequency is in proportion to a rotation number (rotational speed) of the motor, and which ripple results from the presence of a brush in the DC motor.

2. Description of the Background

A circuit is widely used in various fields wherein a DC motor position control is made, or a control is performed for positioning a member which is driven by a DC motor. For example, in a vehicle, a circuit of this kind is used in a closed condition detection device for power window and sun-roof devices, as well as in a memory for a seat device which stores a seat condition of at least one of a seat-cushion, a seat-back and a headrest, to comply with a passenger profile.

For example, in the memory seat device, the motor rotation condition has to be known, and a position sensor or the like is used for detecting the rotation condition of the motor which drives the seat device. This may be done by detecting the condition of a magnet which is fixedly mounted on a rotation shaft (i.e., the armature shaft) of the motor using a sensor such as a Hall element, and the resulting pulse signal issued from the sensor is used in a controller for the position control of the motor or the member driven by the motor. See, for example, pages 5–88 and 89 in NEW CAR MANUAL: SOARER published on May 1991 by TOYOTA MOTOR CO., LTD. In this way, the controller performs position control by reading the rotational pulse signal from the Hall element, thereby making it possible to provide a rotational pulse signal in the seat position control.

However, this conventional structure requires use of a Hall element and magnet, which increases the number of parts, lowers the assembly efficiency and increases the production costs. It is therefore desired to provide method which does not require a sensor such as a Hall element to produce a rotational pulse signal whose frequency is in proportion to the rotation number of a motor, by processing a detected signal (i.e., analog signal), such as a motor current or a motor voltage, which can be easily obtained from the motor in a direct fashion.

For example, due to that fact that in a DC motor, the presence of a brush superposes a ripple, whose frequency is in proportion to the rotation number of the motor, on a motor current, processing the motor current (i.e., analog current) generates a ripple pulse train whose frequency is in proportion to the rotation number of the motor.

However, if such a method is used, any noise other than the ripple which is superposed on the motor current has to be eliminated. To this end, in view of the fact that the frequency of the ripple pulse train is in proportion to the rotation number of the motor, the electric circuit processing the signal must be capable of adjusting a cutoff frequency of a filter in response to the rotation number of the motor. To this end, the cutoff frequency of the filter may be adjusted in response to the rotation number of the motor by feeding back the generated ripple pulses. However, before the motor is turned on, such feedback is not made, so that the correctness of the cutoff frequency of the filter is not always guaranteed.

Thus, a pulse error may occur wherein the pulse train becomes lost due to an unexpected loss of the ripples when passing through the filter, or due to an increase in the number of the pulses due to the noise. In this case an indirect estimation of the rotation number of the motor can be made on the basis of the motor current and/or the motor voltage, which makes it possible to establish a control for determining the cutoff frequency of the filter when the motor is energized, on the basis of the motor current and/or motor current.

However, due to the fact that, in general, actual electric circuits vary in rating values relative to the designed rating values, the cutoff frequency may fall outside the correct value range (i.e., permissible correct value range), which causes pulse errors similar to the above. In addition, due to the fact that the aforementioned hardware variation of the electric circuit varies with temperature, temperature changes may also shift the value of the cutoff frequency from its designed value, which may result in a pulse error. The aforementioned problems have to be solved in order to realize a pulse generating device which generates a pulse signal for position control, which signal is directly derived from a motor and without using a sensor.

Therefore, a needs exists to provide a rotational pulse generating circuit for motors which is free from the aforementioned problems.

SUMMARY OF THE INVENTION

It is, therefore, a first aspect of the present invention to provide a rotational pulse signal generating circuit which comprises a filter for eliminating noise from a signal inputted thereto, which signal is superposed with a ripple whose frequency is in dependent on a rotation number of the motor, the filter having a cutoff frequency which is variable on the basis of an external signal; a pulse shaper for converting an output signal of the filter to a pulse signal whose frequency is in response to the rotation number of the motor; a clock generator for generating a clock signal on the basis of the pulse signal and a rotational condition signal of the motor, the clock signal being fed to the filter for making the cutoff frequency thereof variable; and a correction device for preliminarily oscillating the clock signal before turning on the motor, the correction means judging whether or not an initial cutoff frequency is adequate on the basis of the preliminary oscillated clock signal, the correction device correcting the initial cutoff frequency when the result of the judgment is found to be inadequate.

In accordance with the first aspect of the present invention, the filter is fed with the clock signal which is generated on the basis of the pulse signal and the motor rotation condition signal, thereby making the cutoff frequency of the filter variable, which makes it possible to generate a ripple pulse train correctly in response to a change of the motor rotation condition which results from at least one of a motor load change, motor rotation number, motor driving voltage and rotation environment. In addition, before the motor is turned on, it is checked whether or not the initial cutoff frequency is adequate on the basis of the clock signal which is preliminarily oscillated at the clock generator. If the result is negative, the initial cutoff frequency is corrected to be adequate. Thus, even if the product has non-standard characteristics, the initial cutoff frequency is corrected upon initiation of the motor. As a result, even at the stage of inputting the pulse signal to the clock generator during the initial stage of motor initiation, the cutoff frequency which is set on the basis of the motor rotation condition signal is made adequate or correct, thereby correctly generating the pulse signal even when the motor is at its initial stage of initiation.

A second aspect of the present invention provides a rotational pulse generating circuit as a limited version of the first aspect, wherein the rotational condition signal is based on a motor rotational signal and a motor driving voltage signal, in which the correction device stores a plurality of values such that one of the values is to be selected as a adequate value of the cutoff frequency depending on a motor driving voltage, the correction device finds, when the judgment is made, the adequate value depending on the motor driving voltage represented by the motor driving voltage signal which is externally inputted, and the correction device judges whether or not the initial cutoff frequency is adequate by comparing the preliminary oscillated cutoff frequency to the found adequate value. It is to be noted that the adequate value can be a range of values.

In accordance with the second aspect of the present invention, upon judgment, the adequate value is found depending on the motor driving voltage, and it is checked whether or not the initial cutoff frequency is adequate by comparing the adequate value to the cutoff frequency based on the preliminarily oscillated clock signal. Thus, the setting of the initial cutoff frequency is made adequate in consideration of the motor driving voltage. For example, when a battery is used for driving the motor, which may change the motor driving voltage, generating the pulse signal can be made correctly.

A third aspect of the present invention is to provide a rotational pulse generating circuit as a limited version of the second aspect, wherein the correction means includes an attenuator and a controller for switching an attenuance of the attenuator, the attenuator being placed at a pre-stage of an input side of the clock generator so that an attenuance of the rotational condition signal is made variable.

In accordance with the third aspect of the present invention, when the initial cutoff frequency is found to be inadequate, the attenuator, which is placed at the pre-stage of input side of the clock generator, is controlled to change the attenuance of the motor rotation condition signal, thereby adjusting or correcting the initial cutoff frequency. Using the attenuator which amends the attenuance in switching fashion makes the circuit simple.

A fourth aspect of the present invention is to provide a rotational pulse generating circuit as a limited version of any one of the first aspect, the second aspect, and the third aspect, wherein the correction device executes the judgment procedures whenever the motor is turned on.

In accordance with the fourth aspect of the present invention, the correction device executes the judgment procedure whenever the motor is turned on, which makes it possible to set the correct initial cutoff frequency whenever the motor is turned on. For example, the set initial cutoff frequency can consider the thermal changes (including the thermal character change of the rotational pulse generating circuit, per se, and/or thermal dependency of the battery voltage), thereby generating the pulse signal more correctly.

A fifth aspect of the present invention is to provide a rotational pulse generating circuit as a limited version of the first aspect, wherein the correction device executes the judgment procedure by preliminarily oscillating the clock signal at the clock generator on the basis of the motor driving voltage signal.

In accordance with the fifth aspect of the present invention, the judging is made concurrently with the preliminary oscillation whenever the motor is turned on, which makes it possible to efficiently avoid an occurrence of pulse errors.

According to the invention, a rotational pulse generating circuit for a motor comprises a filter for eliminating noise from a first signal outputted by the motor on the basis of a cutoff frequency, the first signal including a ripple whose frequency corresponds to a rotation number of the motor; a pulse shaper for converting an output signal of the filter to a pulse signal whose frequency corresponds to the rotation number of the motor, a generator for generating a clock signal on the basis of the pulse signal and the first signal, the generator outputting the clock signal to the filter so as to vary the cutoff frequency; a pre-oscillator for pre-oscillating the clock signal at the generator before the motor is energized; and a compensating device for compensating the pre-oscillated cutoff frequency to an adequate frequency when the pre-oscillated cutoff frequency is an inadequate frequency.

BRIEF DESCRIPTION OF THE DRAWINGS

The above and other objects, features and advantages of the present invention will be more apparent and more readily appreciated from the following detailed description of a preferred exemplary embodiment of the present invention, taken in connection with the accompanying drawings, in which.

DETAILED DESCRIPTION OF THE PREFERRED EMBODIMENT

A preferred embodiment of the present invention will be described hereinafter in detail with reference to the accompanying drawings.

Figure 1:
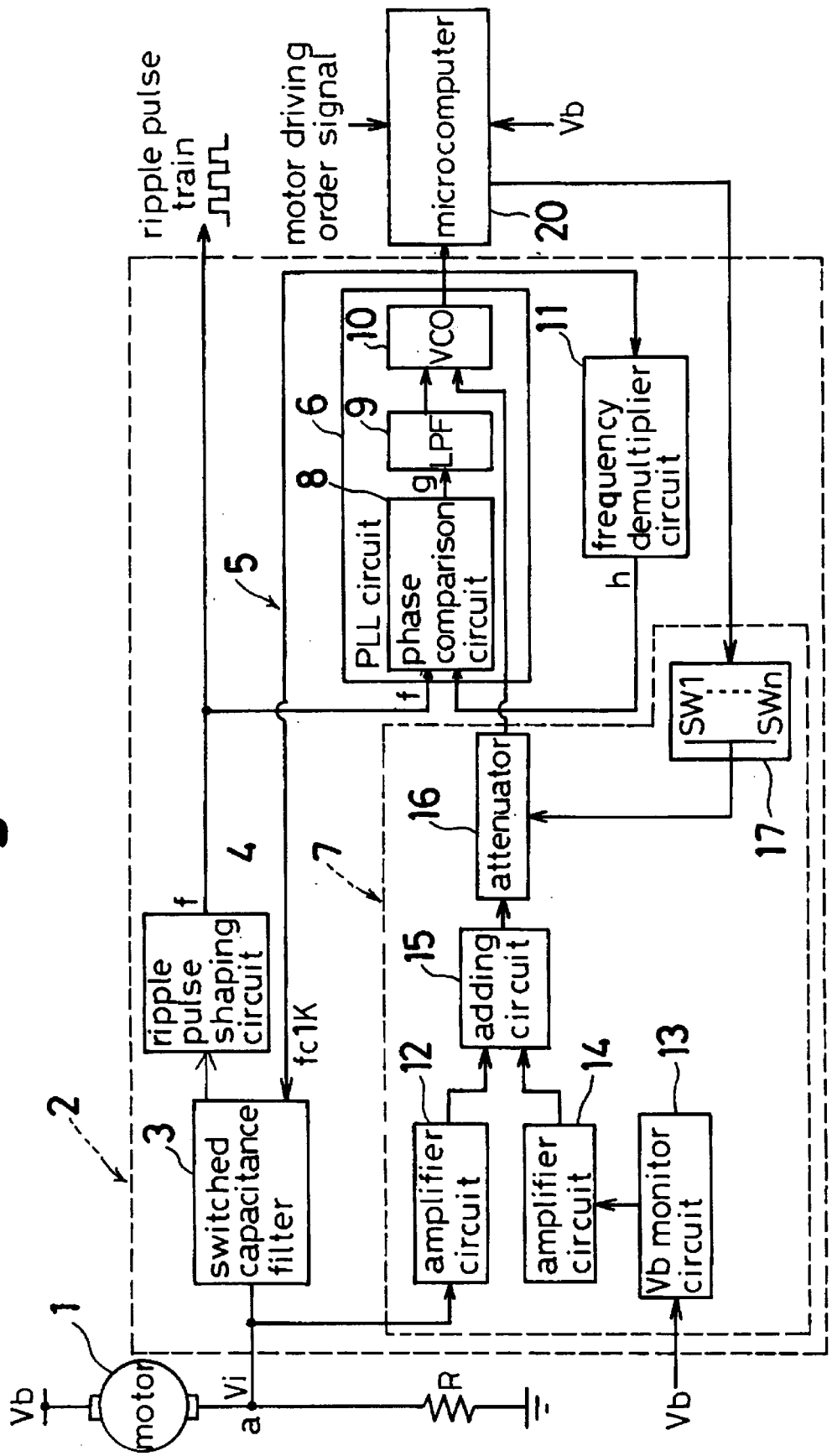
FIG. 1 is a block diagram of a rotational pulse signal generating circuit in accordance with a first embodiment of the present invention.

First, with reference to FIG. 1, there is illustrated a schematic diagram of a rotational pulse generating circuit 2 which generates a ripple pulse train indicative of the number of rotation S of a DC motor 1. The circuit 2 includes a switched capacitance filter (SCF) 3, a ripple pulse shaping circuit 4, and a clock generating circuit 5. The switched capacitance filter (SCF) 3 acts as a filter whose cutoff frequency varies when a filter constant changes upon receipt of an external signal (i.e., a clock signal). The ripple pulse shaping circuit 4 acts as a pulse shaper for generating ripple pulses (i.e., a ripple pulse train) depending on a signal outputted from the filter 3. The clock generating circuit 5 generates a clock signal whose frequency is fCLK and which varies the cutoff frequency of the filter 3 on the basis of the ripple pulse train outputted from the ripple pulse shaping circuit 4 and motor rotation conditions (i.e., motor rotation signal and motor driving voltage Vb). The motor rotation signal to be inputted to the circuit 2 is in the form of a potential voltage which is measured at a position (a) at a junction between the DC motor 1 and a shunt resistor R, and which is of a value Vi proportional to the value of current i passing through the DC motor. On the motor rotation current, there is superposed a ripple which results from the presence of a brush (not shown) of the DC motor 1, and whose frequency is in proportion to the rotation number of the DC motor 1.

The clock generating circuit 5 includes a PLL (phased locked loop) circuit 6 and a frequency correcting circuit 7 which oscillates a signal for correcting an oscillated frequency of the PLL circuit 6 depending on the motor rotation condition signal. The PLL circuit 6 is made up of a phase comparison circuit 8, a low pass filter (LPF) 9 and an oscillation circuit (VCO) 10. The phase comparison circuit 8 compares phases of two signals inputted thereto and outputs a signal which is indicative of the result of the comparison. The low pass filter (LPF) 9 smooths the signal outputted from the phase comparison circuit 8. The oscillation circuit (VCO) 10 outputs a clock signal whose oscillation frequency is fCLK, depends on a deviation voltage between the signal outputted from the frequency correcting circuit 7 and an output signal of the low pass filter 9. The PLL circuit 6 is connected with a frequency divider circuit 11 which divides the oscillation frequency (e.g., by 100f when the ripple pulse train frequency is assumed to be f) of the clock signal issued from the oscillation circuit 10 to f. The output of the frequency divider circuit 11 is inputted to the phase comparison circuit 8 of the PLL circuit 6.

The frequency correcting circuit 7 includes an amplifier circuit 12 which amplifies a signal issued from the DC motor 1 which is in proportion to the motor current, an amplifier circuit 14 which amplifies a motor driving voltage signal which is fed from a monitor circuit 13 which monitors the motor driving voltage Vb, an adding circuit 15 which adds the output values of the respective amplifier circuits 12 and 14, and an attenuator 16 which attenuates an output signal which is issued from the adding circuit 15. A motor rotation condition signal outputted from the attenuator 16 is fed or inputted to the VCO 10. A switching circuit 17 is coupled to the attenuator 16 for changing the attenuating degree in a stepwise fashion. The switching circuit 17 is under the control of a microcomputer or microcomputer 20.

When the microcomputer 20 receives a motor drive instruction signal which is indicative of an order to energize the DC motor 1, the microcomputer 20 orders the VCO 10 to generate a preliminary clock signal, and checks before the DC motor 1 is turned on whether or not an initial cutoff frequency of the filter 3 is adequate (i.e., within a permissible range) by judging the resulting clock signal fed from the VCO 10. If the initial cutoff frequency is found to be inadequate (i.e., out of the permissible range), the switching circuit 17 is operated to change the attenuating degree of the attenuator 16, thereby adjusting the initial cutoff frequency of the filter 3. The adjustment of the initial cutoff frequency of the filter 3 will be detailed later. It is to be noted that the attenuator 16, the switching circuit 17 and the microcomputer 20 constitute a correction device. The switching circuit 17 and the microcomputer 20 constitute a controller. The circuit 2, the microcomputer 20, and others constitutes a rotational pulse generating circuit.

It is to be noted that the reason why such a correction of the initial cutoff frequency is required is due to an inevitable deviation in initial cutoff frequency of an actual filter 3 from the standard design. Pulse errors occurring when the DC motor 1 is turned on are thought to be caused by variations in the ripple frequency resulting from non-standard (i.e., deviations from nominal) characteristics of the actual DC motor 1, and variations in the cutoff frequency resulting from non-standard characteristics in the actual circuit 2. Depending on the values of both the deviations, the defective fraction of the products in which a pulse error occurs is determined. Thus, in order to lower the defective fraction to a level which is permissible in production (i.e., as near as 0%), in the present embodiment, a concept of correcting the initial cutoff frequency is employed.

Figure 2:
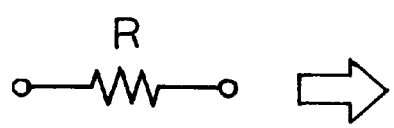
FIG. 2 shows how to operate a switched capacitance filter of the rotational pulse signal generating circuit shown in FIG. 1.
Figure 2:
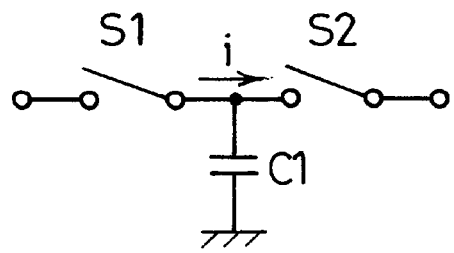
Figure 2:
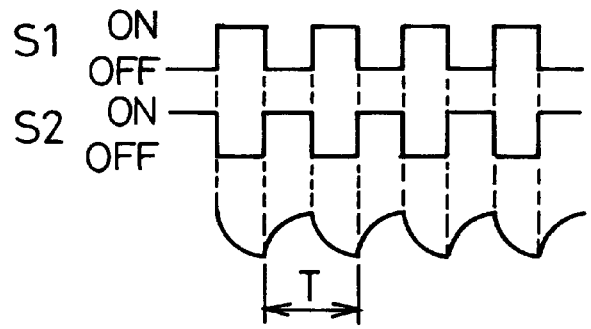
Figure 2:
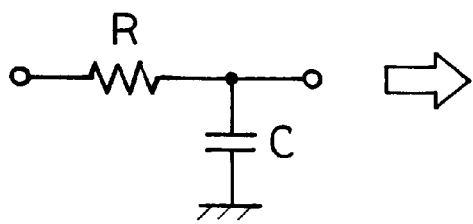
Figure 2:
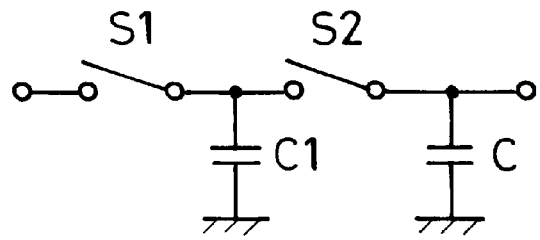

Hereinbelow, each circuit will be described in detail. As can be easily understood from FIG. 2(a), the switched capacitance filter 3 is a practical version of a well known switched capacitance circuit which is constituted by a pair of analogue switches S1 and S2 and a capacitor C1. If the switches S1 and S2 are turned on and off alternately at a cycle of T, an electric current i may be expressed by a formula i=V/(1/fC) where f=1/T. Thus, the switched capacitance can be regarded as an equivalent of a resistor R. The cutoff frequency fc of a CR-filter shown in FIG. 2(b) which is an application of such a switched capacitance circuit which is variable, depending on frequency for alternately turning the switches on-and-off. In the case of the switched capacitance filter, instead of frequency, a clock input is used. Such a cutoff frequency fc can be expressed as a formula which is specified in FIG. 2(b). It is to be noted that a commercially available IC is used as the switched capacitance filter, which is supplied from National Semiconductor under the item code of MF6-50. This has a noise reduction function and provides a cutoff frequency of fc=fCLK/N where fCLK and N are a clock input frequency and a constant, for example, 100, respectively. Thus, setting fCLK=100f results in fc=f.

Figure 3:
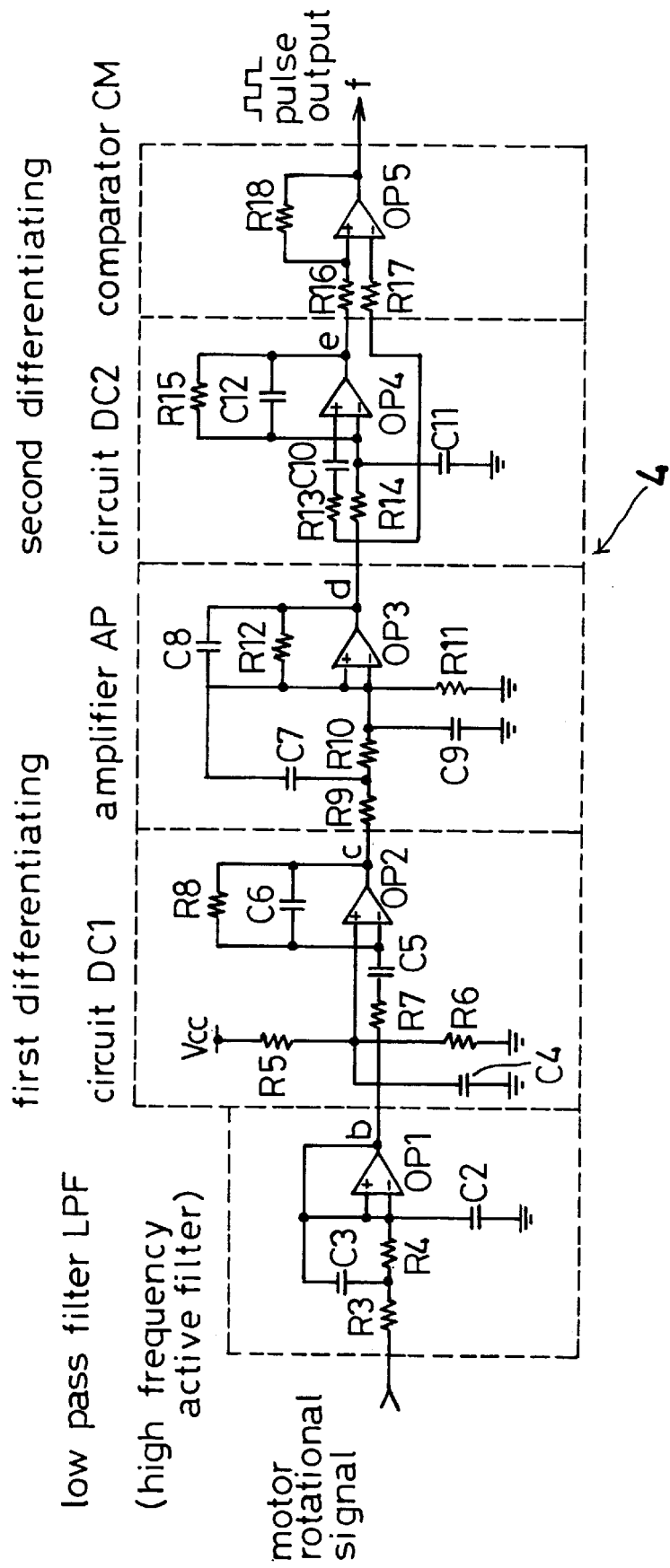
FIG. 3 is a block diagram of a ripple pulse shaping circuit which is a part of the rotational pulse signal generating circuit shown in FIG. 1.

The ripple pulse shaping circuit 4, as can be seen from FIG. 3, includes a high frequency active filter (i.e. low pass filter) LPF, a first differentiating circuit DC1, a second differentiating circuit DC2, an amplifier AP and a voltage comparator CM.

In the high frequency active filter LPF, a series of resistors R3 and R4 are coupled to an inverting terminal of an operational amplifier OP1 which is also grounded by way of a capacitor C2. A non-inverting terminal of the operational amplifier OP1 is connected via a capacitor C3 to a connecting point at which the resistors R3 and R4 meet for feedback control. The high frequency active filter FL2 serves for eliminating a high frequency component of the motor rotational signal. In detail, for example, a noise component above the maximum rotational speed (for example, 6000 rpm) can be eliminated by its damping or decay factor, so that the high frequency active filter FL2 acts as low pass filter (LPF) which deletes noise superposed on the motor rotational signal, or ripple frequency.

The first differentiating circuit DC1 is connected to an output terminal (b) of the low pass filter (i.e., the high frequency active filter) LPF for differentiating the signal issued or outputted therefrom, thereby damping or decaying dc components of the signal. A series connection of a resistor R7 and a coupling capacitor C5 is connected to an inverting terminal of an operational amplifier OP2. A voltage divided by resistors R5 and R6 connected in series is applied to a non-inverting terminal of the operational amplifier OP2, and a connecting point at which the resistors R5 and R6 meet is coupled with a bypass capacitor C4. A parallel connection of a resistor R8 and a capacitor C6 is connected between the inverting input terminal and an output terminal (c) of the operational amplifier OP2.

The amplifier AP is so designed as to amplify a signal issued from the output terminal (c) of the operational amplifier OP2 of the first differentiating circuit DC1. The amplifier AP1 includes an operational amplifier OP3 whose inverting input terminal is connected to the output terminal (c) of the operational amplifier OP2 via a series of resistors R9 and R10. The inverting input terminal of the operational amplifier OP3 is also grounded by way of a capacitor C9. A capacitor C7 is interposed between a non-inverting terminal of the operational amplifier OP3 and a point at which the resistors R9 and R10 meet. The inverting terminal of the operational amplifier OP3 is grounded by way of a resistor R11. A capacitor C8 and a resistor R12 which are arranged in parallel are connected between the non-inverting input terminal and an output terminal (d) of the operational amplifier OP3.

The second differentiating circuit DC2 is connected to the output terminal (d) of the operational amplifier OP3 of the amplifier AP and differentiates a signal outputted therefrom for establishing a phase shift of 90 degrees. The second differentiating circuit DC2 includes an operational amplifier OP4 whose inverting input terminal is connected to the output terminal (d) of the operational amplifier OP3 of the amplifier AP via a resistor R14. The inverting input terminal of the operational amplifier OP4 is grounded by way of a capacitor C11. Between the output terminal (d) of the operational amplifier OP3 and a non-inverting input terminal of the operational amplifier OP4, there are interposed a resistor R13 and a capacitor C10 which are arranged in series. A resistor R15 and a capacitor C12 which are arranged in parallel are connected between the inverting input terminal and an output terminal of the operational amplifier OP4.

The comparator CM compares output signals from the respective output terminal (e) of the second differentiating circuit DC2 and output terminal (d) of the amplifier AP. The comparator CM includes an operational amplifier OP5 whose inverting input terminal is connected via a resistor R17 to the output terminal (d) of the operational amplifier OP3 of the amplifier AP. A non-inverting input terminal of the operational amplifier OP5 is connected via a resistor R16 to the output terminal (e) of the operational amplifier OP4 of the second differentiating circuit DC2. A resistor R18 is connected between the non-inverting input terminal and the output terminal (f) of the operational amplifier OP5. From the output terminal of the operational amplifier OP5, a rectangular, or "ripple," pulse train signal is set to be outputted which corresponds to the ripple frequency. It is to be noted that this ripple pulse train is based on motor ripple and therefore its wave-shape is in the form of ripple.

Figure 4:
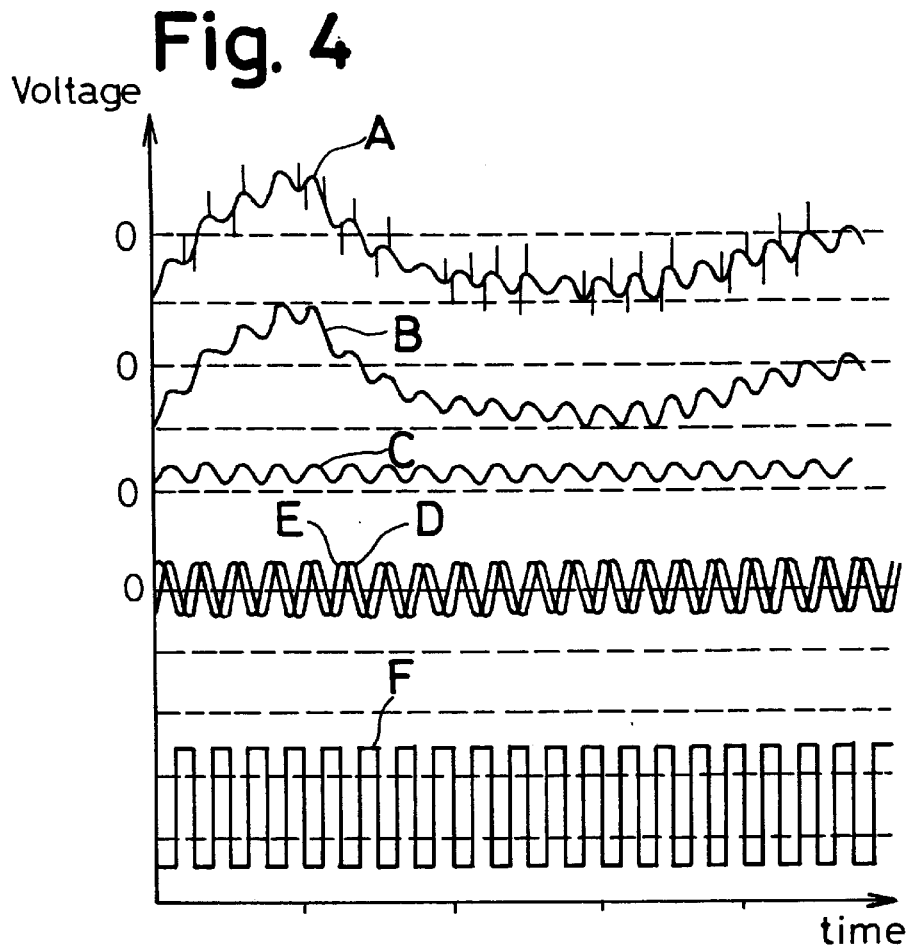
FIG. 4 shows graphs, each of which is indicative of a waveform at various points in the ripple pulse shaping circuit shown in FIG. 3.

The signal at each of the output terminals (a), (b), (e), (d), (e) and (f) in the pulse wave-form shaping circuit 3b takes a wave shape as illustrated in FIG. 4. The current flowing through the commutator DC motor 11 is converted into a voltage signal, or motor rotational signal which is in proportion thereto in magnitude. This voltage signal is superposed with ripple together with noise and has a wave shape indicated at "A" in FIG. 4. The ripple is inevitable, as is well known, when the DC motor 1 is being driven or turned on. That is to say, the ripple results from the fact that the number of coils to be connected to plural segments of the commutator when the segments pass the brush, and the current changes which flows through the coil due to the resistive change when the DC motor 1 is in operation.

When passing the voltage signal through the switched capacitance filter 3, the noise superposed on the voltage signal is eliminated from the voltage signal. However, another noise superposed on the clock input whose clock frequency is fCLK, which is inputted to the switched capacitance filter 3, appears on the voltage signal when outputted from the switched capacitance filter 3. Thereafter, the voltage signal after passing though the high frequency active filter LPF, comes to have the wave shape as indicated by "B" in FIG. 4, which is smooth and noiseless. Passing such a voltage signal having the wave-shape "B" through the first differentiating circuit DC1 differentiates the voltage signal, thereby damping or decaying its DC component. Thus, the resultant voltage signal becomes to have wave-shape "C" in which only a ripple component is involved. Furthermore, if the voltage signal passes through the amplifier AP, the amplitude of the voltage signal is amplified to have the wave shape "D." Thereafter, passing such a voltage signal through the second differentiating circuit DC2 causes the voltage signal becomes to have the wave shape "E" which is delayed in phase by 90 degrees with respect to the wave shape "D". Then, comparing the voltage signal having the wave shape "D" which is outputted from the amplifier AP and the voltage signal having the wave shape "E" which is outputted from the second differentiating circuit DC2, the comparator CM issues the ripple pulse train signal having the wave-shape "F."

In the foregoing clock generation circuit 5, a clock signal is generated, which is used as a clock input for the switched capacitance filter 3 by a frequency conversion such that the frequency of the ripple signal is multiplied by an integer. In the present embodiment, a feedback of the ripple pulse signal is made in synchronization with the motor rotational condition signal so that the frequency f of the ripple pulse is brought into coincidence with the cutoff frequency fc of the switched capacitance filter 3.

In detail, whenever the pulse signal having the wave-shape "F" is inputted or fed to the phase lock loop circuit (PLL) 6, the phase lock loop circuit (PLL) 6 outputs a frequency of 100fp which is derived by the formula: fc=fCLk/N where N=100. Using the frequency demultiplier circuit 11 enables the phase lock loop circuit (PLL) 6 to have a frequency conversion function. The output of the phase lock loop circuit 6 having a frequency of 100fp is divided by 100 at the frequency demultiplier 11, and the frequency demultiplier 11 feeds the resultant frequency of fp to one of the input terminals of the phase comparison circuit 8, while the other input terminal of the phase comparison circuit 8 is fed with the ripple pulse signal. In brief, a phase control of the output signal of the frequency demultiplier 11 is made to oscillate a frequency which is in coincidence with the frequency f of the ripple pulse inputted to the phase lock loop circuit (PLL) 6. Thus, the outputted clock signal is stabilized in a steady area. It is to be noted that changing the demultiplier ratio of the demultiplier circuit 11 causes the cutoff frequency fc to change according to the following formula:

fc=fclk/(NK)

where N and K are an integer and a constant, respectively.

In addition, for stabilizing the foregoing oscillation upon startup of the DC motor 11, the oscillation circuit 10 is fed with the motor rotation condition signal which is made up of the motor rotational signal and the motor driving voltage signal, thereby not making the output of ripple pulse unstable. The motor rotational condition signal serves for producing the ripple pulse train without generating any error pulse.

Figure 5:
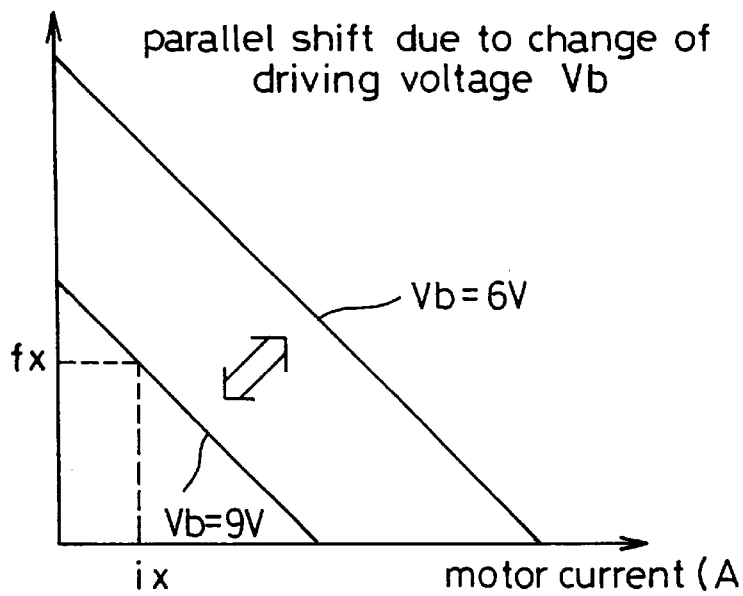
FIG. 5 indicates a relationship between a motor current as a function of motor driving voltage and a motor rotational number.

Referring now to FIG. 5, there is depicted a graph which is indicative of a characteristic of the DC motor 1. This graph shows the relationship between the motor current (measured in Amps), and the rotation number of the DC motor 1, as a characteristic line L whose position shifts, with a constant slope, according to the value of a parameter of the motor driving voltage (i.e., battery voltage). In this graph, the characteristic line is illustrated only for motor driving voltages between 9 volts to 16 volts inclusive. As the motor driving voltage increases, the motor current and the rotation number of the motor shift in parallel mode, and in higher direction. Using this characteristic line L makes it possible to predict or forecast the rotation number of the DC motor 1 on the basis of the motor driving voltage and the motor current. For example, when the motor driving voltage Vb is 9 volts and the motor current is ix, the character line L forecasts that the corresponding motor rotation number is fx. The frequency correction circuit 7 is designed based on such s concept.

In detail, the frequency correction circuit 7 issues the motor rotation condition signal which makes the VCO 10 oscillate the clock signal whose frequency is an integral multiple (e.g., 100f) of the ripple frequency (e.g., f), which forecasts motor rotation number based on the two inputs: the motor rotation signal and the motor driving voltage. Upon turning the DC motor 1 on, the clock signal fCLK from the VCO 10 is based on the motor rotation signal and the motor driving voltage, thereby varying or adjusting the cutoff frequency, thereby generating or shaping the ripple pulse train based on the rotation condition of the DC motor 1.

Thereafter, when the motor current becomes stable and the ripple pulse shaping circuit 4 begins to successively produce the ripple pulses, the circuit 6 performs phase control of the clock signal by means of feedback control, for establishing phase coincidence between the ripple pulse having the frequency f and the signal outputted from the demultiplier circuit 11. This ensures that the switched capacitance filter 3 is inputted with a clock signal of stable oscillation. Thus, the cutoff frequency fc of the switched capacitance filter 3, even at an initial phase of the DC motor 1, becomes variable in a linear mode, and the ripple pulses are produced in dependence on the variable cutoff frequency.

Figure 6:
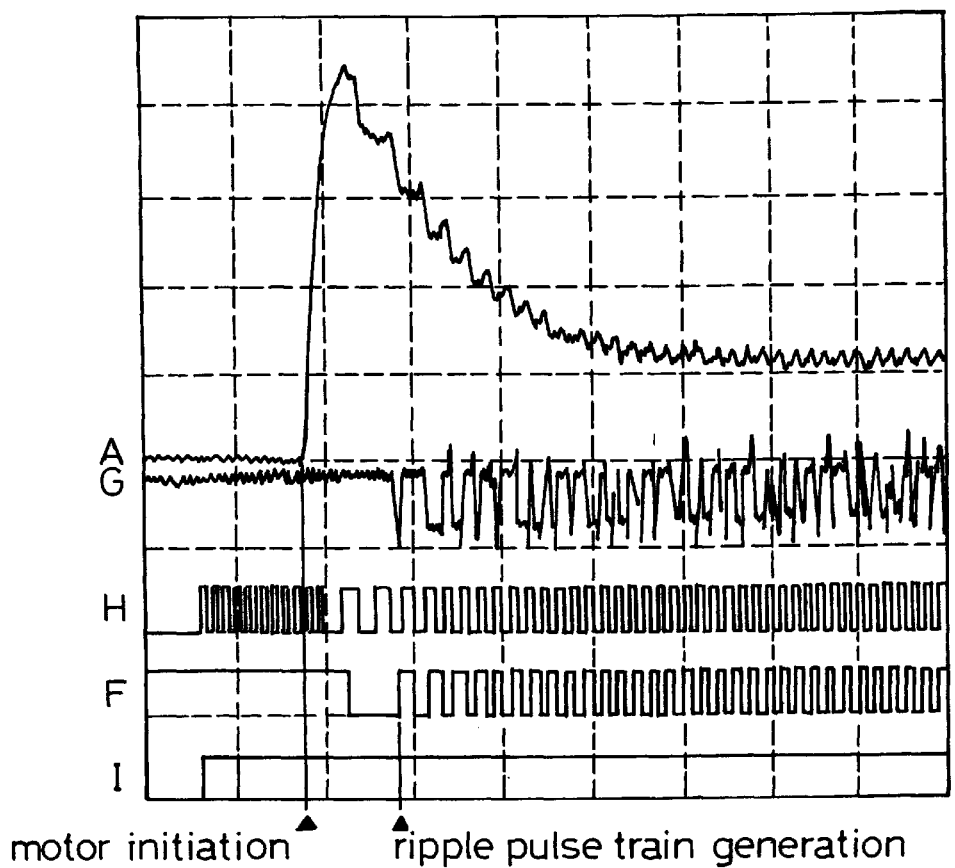
FIG. 6 shows graphs, each of which is indicative of a waveform at various points in the rotational pulse signal generating circuit shown in FIG. 1.

When the DC motor 11 is at its initial stage of operation, as shown in FIG. 6, the signals at the output terminals (a), (g), (h),and (f) in FIG. 1 follow waveforms (A), (G), (H) and (F), respectively. The motor driving order signal to be inputted to the microcomputer 20 has the waveform (I) at the bottom of the graph shown in FIG. 6. When the motor driving order signal becomes H, or indicates ON, the microcomputer 20 operates the VCO 10 to preliminarily oscillate the clock signal for a time duration of, for example, 50 to 300 milliseconds prior to the initiation of the DC motor 1. The microcomputer 20 continually monitors the resultant clock signal and measures the oscillating frequency fclk of the clock signal by detecting the pulse width thereof. As can be easily understood from the motor characteristic graph in FIG. 7, the oscillated frequency fclk measured by the microcomputer 20 at the preliminary oscillation indicates an oscillation frequency to be used for setting the cutoff frequency when the DC motor 1 is turned on, at a motor rotation number when the motor current is 0 amperes or at the motor's maximum rotation number (e.g., 6000 rpm). The microcomputer 20 checks whether or not the cutoff frequency fc which is determined by the measured frequency fclk is adequate or permissible in view of the ripple frequency fmax corresponding to the motor maximum rotation number which is derived from the motor driving voltage Vb at that time. For doing stuck a judgment, the microcomputer 20 stores in its memory (not shown) the map shown in FIG. 7.

Figure 7:
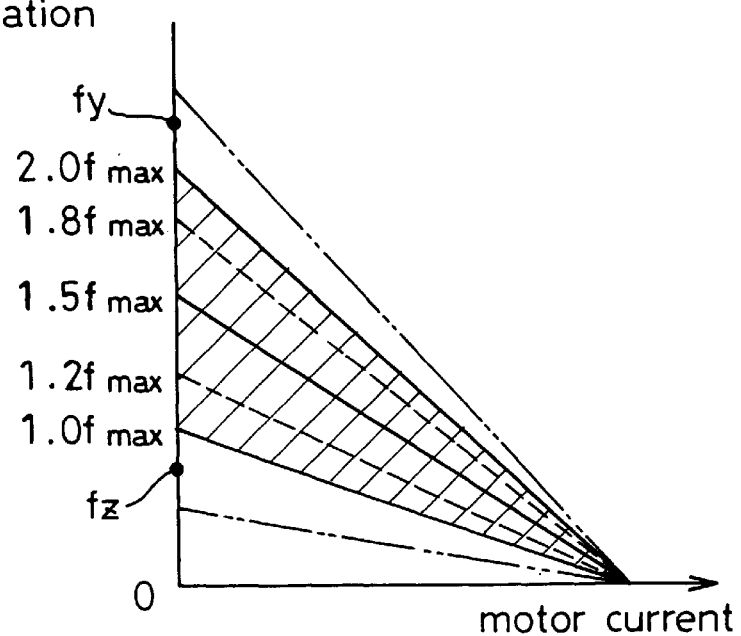
FIG. 7 illustrates a map which is stored in a memory of a microcomputer.

FIG. 7 shows the map which the microcomputer 20 uses for the judging procedure and for determining the degree of attenuation when the value of the oscillated frequency (measured value) is found not to be adequate or permissible. In the graph shown in FIG. 5, the value of the slope of the line indicates the maximum frequency fmax (Hz) when the DC motor 1 rotates at its maximum speed, and which depends on the motor driving voltage Vb. For eliminating the noise resulting from the ripple pulse efficiently, the cutoff frequency is required to be capable of deleting higher frequency components above the maximum frequency fmax, and which is capable of harmonic components less than 2fmax. To this end, the cutoff frequency is so set to meet the formula: 1.0fmax<fc<2.0fmax (hatched area in FIG. 7). The circuit 2 is so designed that 1.5fmax, the mid value of the aforementioned area, is set to be the initial cutoff frequency (i.e., the cutoff frequency when the motor current is 0 amperes). That is, the initial cutoff frequency is set to be 1.5 fmax (cf. FIG. 1) at the degree of attenuation when the attenuator 16 is at SW1. A range represented by a formula of 1.2fmax<fc<1.8fmax, indicated by dash line in FIG. 7 and which allows the current attenuation degree of the attenuator 16 to remain unchanged, is also permissible. The microcomputer 20 checks a measured cutoff frequency fcobs (e.g., 100fclk), which is a conversion of the measured frequency fclk into cutoff frequency. If the result indicates that the measured cutoff frequency fcobs is outside the permissible range, the switching circuit 5 is switched to switch or change the attenuation degree of the attenuator 16. It is to be noted that a map like that depicted in FIG. 7 is prepared for each of the motor driving voltages (cf. FIG. 5). Although in FIG. 7 the motor current is indicated in the x-axis for easy reference, the actual map stored in the memory includes only the y-axis components (fc. initial values).

The attenuator 16 illustrated in FIG. 1 is designed for adjusting the attenuation degree in a stepwise fashion or n-stage mode. The switching circuit 17 includes built-in switches SW1 to SWn (n: integer more than 1) for establishing the n-stage adjustment of the attenuating degree. In the present embodiment, the attenuation degree is divided into three stages and therefore the switching circuit 17 has three switches SW1 SW2, and SW3. The three attenuation degrees of the attenuator 16 are 0.75, 0.50, and 0.89 when the switch SW1 is selected to make the fc initial value 1.5fmax, when the switch SW2 is selected to make the fc initial value 1.2fmax, and when the switch SW3 is selected to make the fc initial value 1.8fmax, respectively. It is noted that these values are examples and that other values can be employed.

When the initial condition is established such that the switch SW1 is selected (the attenuation degree is 0.75), the microcomputer 20 orders the VCO 10 to oscillate preliminarily and judges whether or not the measured cutoff frequency fcobs satisfies the formula: 1.2fmax<fcobs<1.8fmax. If the result indicates that the measured cutoff frequency fcobs is within the permissible range, the selection of the switch SW1 remains unchanged. If not, the switching circuit 17 switches from the switch SW1 to the switch SW2 for changing the attenuation degree. For example, if the measured cutoff frequency fcobs is fy in FIG. 7, which is beyond the highest end of the permissible range, the selection is switched from the switch SW1 to switch SW2 for reducing the attenuation degree from 0.75 to 0.50, whereas if the measured cutoff frequency fcobs is fz in FIG. 7, which is lower than the lowest end of the permissible range, the selection is switched from the switch SW1 to switch SW3 for increasing the attenuation degree from 0.75 to 0.89.

Thus, even though the measured cutoff frequency fcobs falls outside the permissible range of the fc initial value which results from production variations, adjusting the attenuation degree of the attenuator 16 makes it possible to make the cutoff frequency fc fall within the set range: fmax<fc<2fmax. That is to say, an error relative to the designed value is corrected, thereby making it possible to set an adequate fc. Thus, even where the initial cutoff frequency fc falls outside the set range at the initial condition (attenuation degree: 0.75), an acceptable value can be set by adjusting the attenuation degree. If the product has an initial cutoff frequency fc falling within the acceptable range, the distribution of the acceptable products is substantially expanded toward the range enclosed by the double chain lines.

In addition, in case where the measured cutoff frequency fcobs which falls within the set range is outside the permissible range, the attenuation degree of the attenuator 16 is adjusted, so that the initial cutoff frequency fc is set near the center value (=1.5fmax). Thus, even if the actual ripple frequency f of the DC motor 1 differs from its designed value due to production variations, the resulting variations of the cutoff frequency can be narrowed in the circuit 2, thereby making it possible to produce the ripple pulses or ripple pulse train correctly in the circuit 2.

The microcomputer 20 executes the judging procedure whenever the DC motor 1 is turned on. For example, even if the circuit 2 is of its proper thermal characteristics due to product variations, the initial cutoff frequency fc is set in view of the proper thermal characteristic at every initiation of the DC motor 1. Of course, when setting this initial cutoff frequency fc, the battery's thermal dependency is considered, which makes it possible to adequately set the initial cutoff frequency fc in view of the environment when the DC motor 1 is turned on, thereby avoiding pulse errors upon initiation of the DC motor 1. It is to be noted that even though the DC motor 1 is restricted to rotate due to its locked condition during operation, due to the fact that the cutoff frequency fc is determined based on the motor rotation signal and the motor driving voltage, it is possible to make the cutoff frequency fc dependent on the motor rotation change, so that pulse generation depending on the motor rotation condition is possible.

As apparent from the foregoing detailed description, the present embodiment can provide or offer the following advantages or merits.

Before the DC motor 1 is turned on, the PLL circuit 6 is made to operate for preliminarily oscillating, and it is checked whether the cutoff frequency fcobs which is determined by the resultant clock signal is with respect to the permissible range. If not, the initial cutoff frequency fc is made to be within the set range by adjusting the attenuation degree of the attenuator 16. Thus, even though the circuit 2 is of within nominal limits the initial cutoff frequency fc is corrected in view of the proper value of the product, resulting is that no pulse error occurs before the ripple pulse generation which determines the cutoff frequency based on the motor rotation signal at the initial operation stage of the DC motor 1. Thus, counting the number of the ripple pulses makes it possible to correctly detect the position of the movable member which is driven by the motor, thereby further improving the position control of the movable member. In addition, part management and assembly precision are not required for narrowing the production variations of the DC motor and the circuit, and therefore possible losses in productivity can be avoided.

When it is checked whether or not the initial cutoff frequency is adequate, the motor driving voltage (i.e., battery voltage) Vb is considered, thereby avoiding pulse errors even though the DC motor 1 is in the form of an on-vehicle mounted motor which is driven by a battery power source.

The initial cutoff frequency is corrected by the adjusting an attenuation degree by using the attenuator 16 whose attenuation degree is variable in a stepwise fashion, which makes the circuit simpler.

The microcomputer 20 executes the judging procedure whenever the DC motor 1 is turned on, which makes it possible to set the initial cutoff frequency fc independent of thermal environment changes, the thermal characteristics of the circuit and the thermal dependency of the motor driving voltage, thereby avoiding pulse errors upon initiation of the DC motor 1.

Due to the fact that the microcomputer 20 executes the preliminary oscillation and the judging procedure by being inputted with the motor driving order signal, the microcomputer 20 must operate only when the DC motor 1 is turned on, which results in that the ability of the microcomputer 20 can be utilized effectively.

It is to be noted the embodiment is not restricted and therefore can be modified as follows. The motor is not restricted to the DC motor 1. Any motor, such as an AC motor from which a signal can derive a ripple pulse train whose frequency is in proportion to the motor rotation number, can be used.

The value of the initial cutoff frequency fc is not necessarily the mid value of the set range. In view product variations, any value shifted from the mid value of the set range is possible. In addition, the initial cutoff frequency fc is not necessarily the mid value of the permissible range used in the judging procedure. The relationship between the set range and the permissible range is flexible, and therefore both ranges can be same.

Though the switch SW1 of the switching circuit 7 is described for operation at the initial operation of the motor, the switch which was selected at the previous initiation of the motor can be used for the next initial condition. For example, when the initial cutoff frequency is found to be inadequate with the selection of the switch SW2, the switch SW1 is selected. In this case, a different permissible range and set range are set for each attenuation degree.

After measuring oscillating frequencies by selecting two or more switches SW1, - - - , SWm (m>2), a method can be employed wherein one of the resultant initial cutoff frequencies fcbz which is the nearest to the design value of fc is selected. In this case, the most adequate attenuation degree is selected from the prepared attenuation degrees.

The attenuator 16 should not be placed between the adding circuit 15 and the VCO 10. For example, the attenuator 16 can be provided between the adding circuit 15 and one of the amplifier circuits 12 and 14. In brief, the attenuator 16 need only adjust the attenuation degree in a stepwise fashion.

The number of the stages of the variable attenuation degree of the attenuator 16 can be set appropriately. For example, the number of the stages can be set to 2 or 4.

The judging procedure need not be done whenever the motor is turned on. When the motor is tuned on shortly after the latest motor initiation, the judging procedure can be omitted. For example, the judging procedure need be made only when a time duration from 10 to 100 minutes has passed since the latest motor initiation.

The preliminary oscillation and the following judging procedure need not be executed only upon receipt of the motor driving order signal. The executions are permitted any time the motor is at rest. For example, the preliminary oscillation and the judging procedure may be executed in time-interval fashion irrespective of the motor initiation for adjusting the attenuation degree of the attenuator 14, while the preliminary oscillation and the judging procedure are not executed when the motor driving order signal is inputted. In this case, the motor can be initiated immediately upon receipt of the motor driving order signal, which does not delay the beginning of the judging procedure, thereby improving the responsiveness of the motor initiation.

The structure for correcting or adjusting the initial cutoff frequency is not limited to an attenuator. Any structure which varies the initial cutoff frequency in stepwise mode or linear mode can be used. For example, a structure can be used wherein the oscillated frequency of the VCO 10 is controlled by feeding a signal thereto from the microcomputer, which signal is calculated based on the motor rotation signal (motor current signal) and the motor driving voltage signal which are inputted to the microcomputers. Such a structure can eliminate the attenuator. A microcomputer-operated switching element is also available.

The invention has thus been shown and described with reference to specific embodiments, however, it should be understood that the invention is in no way limited to the details of the illustrated structures, and changes and modifications may be made without departing from the scope of the appended claims.

What is claimed is:

1. A rotational pulse generating circuit for a motor, comprising:
    a filter adapted and configured to eliminate noise from a signal inputted thereto, which signal is superposed with a ripple whose frequency is dependent on a rotation number of the motor, the filter being adapted and configured to make a cutoff frequency variable on the basis of an external signal;
    a pulse shaper adapted and configured to convert an output signal of the filter to a pulse signal whose frequency is responsive to the rotation number of the motor;
    a clock signal generator adapted and configured to generate a clock signal on the basis of the pulse signal and a rotational condition signal of the motor, the clock signal being fed to the filter for making the cutoff frequency thereof variable; and
    a correction device adapted and configured to preliminarily oscillate the clock signal before turning on the motor, the correction device judging whether or not an initial cutoff frequency is adequate on the basis of the preliminarily oscillated clock signal, the correction device being configured to make the initial cutoff frequency adequate when the result of the judgment is found to be inadequate.

2. A rotational pulse generating circuit as set forth in claim 1, wherein the rotational condition signal is based on a motor rotational signal and a motor driving voltage signal, wherein the correction device stores a plurality of values of the cutoff frequency such that one of the values is an adequate value of the cutoff frequency for a given motor driving voltage, wherein the correction device determines an adequate value depending on the motor driving voltage represented by the motor driving voltage signal, and wherein the correction device judges whether or not the initial cutoff frequency is adequate by comparing the preliminary oscillated cutoff frequency to the determined adequate value.

3. A rotational pulse generating circuit as set forth is claim 2, wherein the correction device includes an attenuator and a controller adapted and configured to switch an attenuance of the attenuator, the attenuator being placed at an input side of the clock signal generator so that an attenuance of the rotational condition signal may be made variable.

4. A rotational pulse generating circuit as set forth in claim 1, wherein the correction device is adapted and configured to execute a judgment procedure whenever the motor is turned on.

5. A rotational pulse generating circuit as set forth in claim 2, wherein the correction device is adapted and configured to execute a judgment procedure whenever the motor is turned on.

6. A rotational pulse generating circuit as set fort: in claim 3, wherein the correction device is adapted and configured to execute a judgment procedure whenever the motor is turned on.

7. A rotational pulse generating circuit as set forth in claim 1, wherein the correction device is adapted and configured to execute the judgment procedure by preliminarily oscillating the clock signal at the clock signal generator on the basis of a motor driving voltage signal.

8. A rotational pulse generating circuit for a motor, comprising:
    filter means for eliminating a noise from a first signal outputted by the motor on the basis of a cutoff frequency, the first signal including a ripple of whose frequency corresponds to a rotation number of the motor;
    pulse shaping means for converting an output signal of the filter means to a pulse signal whose frequency corresponds to the rotation number of the motor;
    generating means for generating a clock signal based on the pulse signal and the first signal, the generating means outputting the clock signal to the filter means so as to vary the cutoff frequency;
    pre-oscillating means for pre-oscillating the clock signal at the generating means before the motor is energized; and
    compensating means for compensating the pre-oscillated cutoff frequency to be an adequate frequency when the pre-oscillated cutoff frequency is an inadequate frequency.

9. A rotational pulse generating circuit as set forth in claim 8, wherein the first signal is based on a motor rotation signal and a motor driving voltage signal, and wherein the compensating means stores a plurality of adequate frequencies corresponding to various motor driving voltage signals so as to specify an adequate frequency based upon a motor driving voltage signal, and judges an adequacy of the pre-oscillated frequency in comparison with the specified adequate frequency.

10. A rotational pulse generating circuit as set forth in claim 9, wherein the compensating means comprises an attenuator located at an input side of the generating means so as to vary an attenuation magnitude of the first signal, and control means for switching the attenuation magnitude.

11. A method for generating a rotational pulse generating circuit for a motor, comprising the steps of:
    eliminating a noise from a first signal outputted by the motor on the basis of a cutoff frequency using a filter, the first signal including a ripple of whose frequency corresponds to a rotation number of the motor;

converting an output signal of the filter to a pulse signal whose frequency corresponds to the rotation number of the motor;

generating a clock signal based on the pulse signal and the first signal, in a generator, the generator outputting the clock signal to the filter so as to vary the cutoff frequency;

pre-oscillating the clock signal at the generator before the motor is energized; and compensating the pre-oscillated cutoff frequency to be an adequate frequency when the pre-oscillated cutoff frequency is an inadequate frequency.

12. The method as set forth in claim 11, wherein the first signal is based on a motor rotation signal and a motor driving voltage signal, including the steps of storing a plurality of adequate frequencies corresponding to various motor driving voltage signals so as to specify an adequate frequency based upon a motor driving voltage signal, and judging an adequacy of the pre-oscillated frequency in comparison with the specified adequate frequency.

13. The method as set forth in claim 12, wherein the compensating step comprises varying an attenuation magnitude of the first signal, and switching the attenuation magnitude.

* * * * *